United States Patent [19]

Bouyoucos

[11] Patent Number: 4,695,987
[45] Date of Patent: Sep. 22, 1987

[54] HYDROACOUSTIC APPARATUS

[75] Inventor: John V. Bouyoucos, Pittsford, N.Y.

[73] Assignee: Hydroacoustics Inc., Rochester, N.Y.

[21] Appl. No.: 689,521

[22] Filed: Jan. 7, 1985

[51] Int. Cl.$^4$ .................. B06B 3/00; G01V 1/38; H04R 1/02

[52] U.S. Cl. ................... 367/143; 187/120; 116/137 R

[58] Field of Search ............ 181/118, 119, 120, 121, 181/117, 400, 402; 367/140, 141, 143, 189, 190; 116/137 A, 137 R

[56] References Cited

U.S. PATENT DOCUMENTS

| | | | |
|---|---|---|---|
| 3,212,473 | 10/1965 | Bouyoucos | 116/137 A |
| 3,275,977 | 9/1966 | Bouyoucos | 116/137 R |
| 3,382,841 | 5/1968 | Bouyoucos | 367/143 |
| 3,398,758 | 8/1968 | Unfried | 116/137 R |
| 3,472,199 | 10/1969 | Bouyoucos | 116/137 A |
| 3,516,052 | 6/1970 | Bouyoucos | 367/143 |
| 3,978,940 | 9/1976 | Bouyoucos | 367/143 |
| 4,153,135 | 5/1979 | Bouyoucos | 367/143 |

Primary Examiner—Stephen C. Bentley
Assistant Examiner—Brian S. Steinberger
Attorney, Agent, or Firm—Martin Lukacher

[57] ABSTRACT

A hydroacoustic transducer for generating and applying acoustic energy to a load coupling structure has a hydroacoustic amplifier with a driver stage and a power stage. The power stage includes a valve, which obtains high power conversion efficiency by operating to switch the flow of pressurized hydraulic liquid on and off thereby providing a switching amplifier which presents a pressure source of acoustic energy. This source is connected to a load coupling structure by way of an acoustic transformer and an inertive element in series with the source. The inertive element is provided by a liquid-filled bore and is terminated at its input end by the larger area of a stepped piston which provides the acoustic transformer. The smaller area of the stepped piston is in hydraulic communication with the power stage of the hydroacoustic amplifier. The series combination of the transformer and the inertive element resonates with the load coupling structure and provides a band pass frequency response characteristic with the load coupling structure. The hydraulic transformer reduces the input acoustic pressure levels from the amplifier, which are then raised again by the inertive element in the series tuned circuit including the inertive element and the load coupling structure, thereby allowing operation at pressure levels which avoid cavitation in the liquid filled elements of the apparatus as well as providing impedance matching between the hydroacoustic amplifier source and the load. The inertance of the inertive element may be varied with variation in frequency of the energy generated by the amplifier (over frequency sweeps) to maintain optimum tuning of the structure.

33 Claims, 11 Drawing Figures

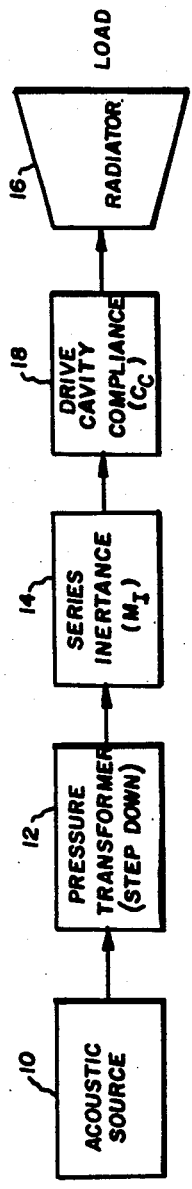
FIG. 1
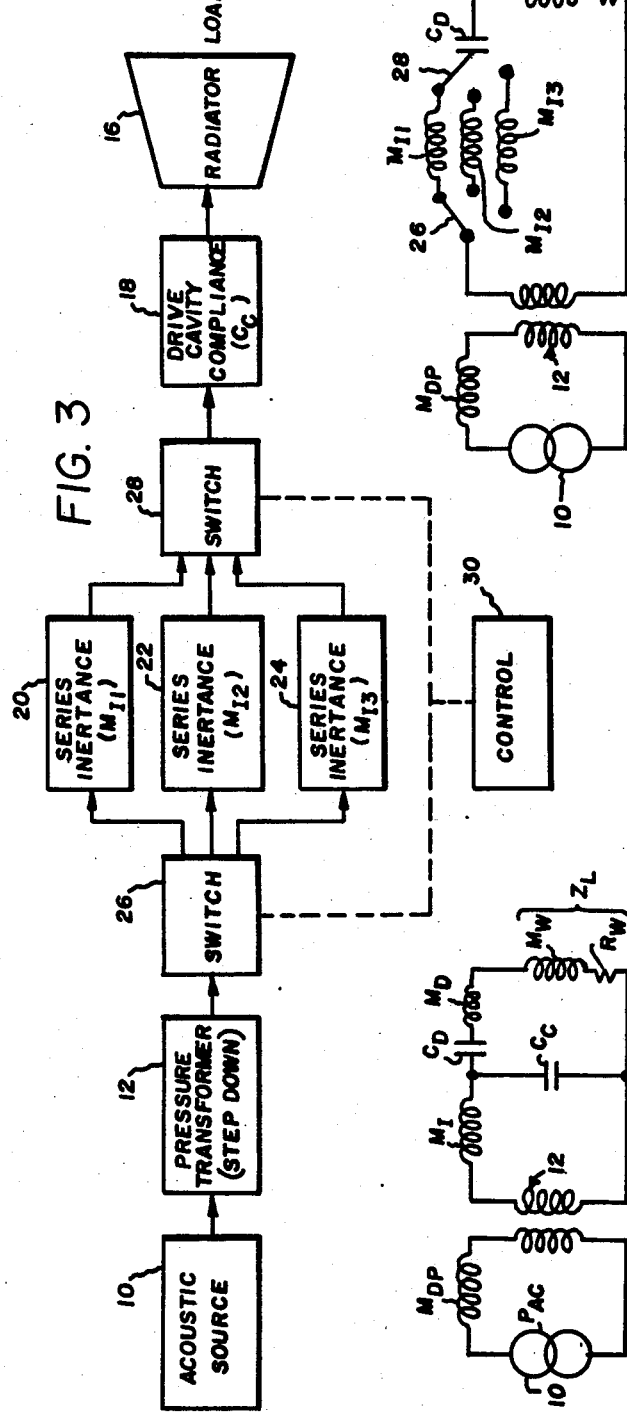
FIG. 3
FIG. 2
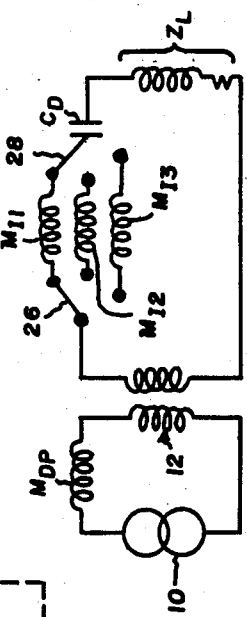
FIG. 4

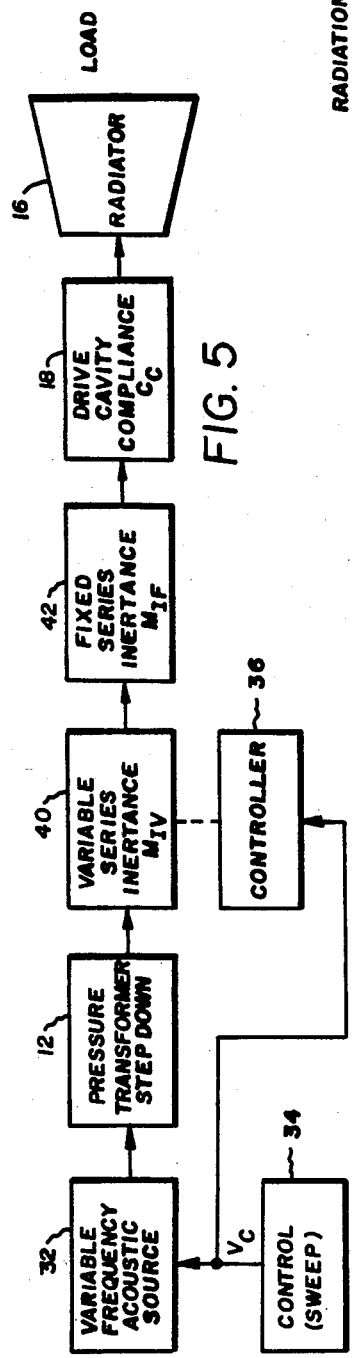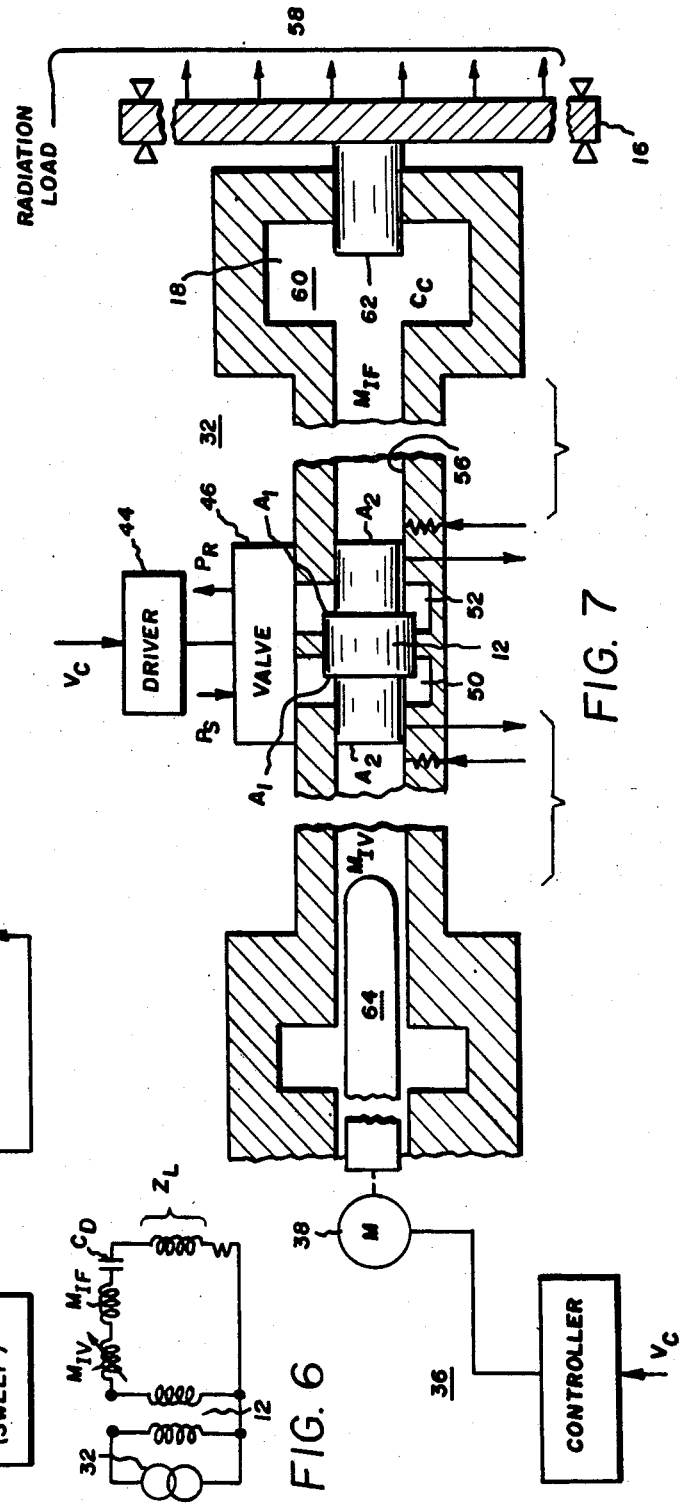

HYDROACOUSTIC APPARATUS

The present invention relates to hydroacoustic apparatus, and particularly to improvements in hydroacoustic transducers for translating the energy in pressurized hydraulic liquid into acoustic energy which appears as vibrations in a load, such as to which a radiating plate or disc is exposed.

The invention is especially suitable for use in the generation of high power acoustic energy for underwater signaling or echo ranging purposes. The invention is also applicable for the generation of acoustic energy for seismic exploration, both on land and underwater, and for industrial purposes.

In hydroacoustic transducers which have heretofore been provided, examples of which appear in U.S. Pat. Nos. 3,275,977 issued Sept. 27, 1966 and 3,978,940 issued Sept. 7, 1976 to the inventor hereof, the hydroacoustic amplifier which provides the source of acoustic energy in the transducer, and especially the valve thereof, must be closely coupled to the radiator, which in the case of underwater transducers are the radiating discs or plates. In transducers having opposed radiator discs or plates, as shown in the above-referenced U.S. Pat. No. 3,978,940, the transducer must be wide enough between the radiators to house the hydroacoustic amplifiers and other components thereof.

It is desirable to provide for additional flexibility in the design of hydroacoustic apparatus, and particularly hydroacoustic transducers, which would enable the location of the hydroacoustic source (the hydroacoustic amplifier), including its driver stage, outside the housing of the discs. The separation of the hydroacoustic amplifier from the radiating structure also enables reduction in the size and weight of the overall apparatus. It provides greater flexibility to package the amplifier and its hydraulic pressure source, such as the pump and its motor drive, inside a protective structure, such as the hull of a vessel, while the radiating structure is mounted on the hull or outside the hull.

Close coupling of the hydroacoustic source and the load has been necessary in order to obtain the requisite bandwidth of operation, thereby enabling acoustic signals to be generated at a desired frequency over the frequency band of interest. To this end, steps have been taken with a parallel acoustic inertance to tune to resonance the compliance presented by the liquid filled drive cavity. This drive cavity is the region into which the acoustic energy from the hydroacoustic source is fed, and from which acoustic energy is coupled to the radiator by means of a piston movable into and out of the liquid filled drive cavity in response to the pressure variations therein. The compliance of this drive cavity may be shunted by an inertance (mass) element to provide a parallel tuned circuit which, together with the series tuned circuit presented by the radiator structure and the radiator load, forms a band pass filter which enables the broadband transfer of acoustic energy to the load in the frequency range of interest. The latter approach is described in the above-referenced U.S. Pat. No. 3,275,977. Another approach, as described in the above-referenced U.S. Pat. No. 3,978,940, is to effectively mass load or increase the inertance of the radiator structure to control the resonant frequency and provide for operation over a wide bandwidth.

To achieve broadened bandwidth with a hydroacoustic amplifier closely coupled to a resonant structure at the load, it has been necessary to use an amplifier source exhibiting high internal impedance. Such sources are relatively inefficient, since their valves must be operated at low pressure modulation (the ratio of the peak dynamic pressure to the average pressure). In this mode, the valve is always partially closed, to achieve high source impedance, thereby making the flow through the valve relatively independent of the load.

The use of a constant pressure source of acoustic energy (the counterpart of an electrical voltage source) would be preferred, since such a source is highly efficient. Such a source may be provided by a switching amplifier having a modulation coefficient approaching 100%, which is obtained by abruptly switching the flow on and off. However, if such pressure sources of acoustic energy were direct coupled to a band pass filter circuit, such as heretofore used, the bandwidth would be limited to that inherent to the series tuned branch, and no broadening would be achieved.

Another problem in the design of hydroacoustic apparatus is the obtaining of high acoustic energy output levels without giving rise to cavitation in the liquid filled elements of the apparatus. Tuned circuits operating near or at their resonant frequencies may develop higher pressures across certain elements of the tuned circuits than are present at their inputs. To avoid cavitation due to these higher pressures, the driving pressure must be reduced, while not affecting the power handling capacity of the driver amplifier or the coupling capacity of the radiator structure.

It is the principal object of the present invention to provide improved hydroacoustic apparatus wherein acoustic energy is coupled to a load in a manner whereby the foregoing drawbacks, disadvantages and problems are substantially eliminated.

It is an object of the present invention to provide improved hydroacoustic apparatus, and paticularly improved hydroacoustic transducers, where the radiating structure of the transducer may be loacted a reasonable distance from the hydroacoustic energy source, such as the hydroacoustic amplifier of the apparatus.

It is still further object of the invention to provide improved hydroacoustic apparatus operable at frequencies, and over frequency ranges of interest, which utilizes pressure sources of acoustic energy such as highly efficient hydroacoustic switching amplifiers.

It is a still further object of the present invention to provide improved hydroacoustic apparatus which produces and transfers to a load, such as a radiating structure, acoustic energy at frequencies and over frequency ranges of interest and at high acoustic energy levels without cavitation in the fluid filled elements of the apparatus.

Briefly described, hydroacoustic apparatus embodying the invention makes use of a source of acoustic energy in which liquid flow is modulated. The source is preferably a hydroacoustic pressure source, such as a switching amplifier in which the coefficient of modulation is 100%. A liquid filled element is connected in series between the source and a load coupling structure to feed the acoustic energy generated in the source to the load. This fluid filled element defines along with the load coupling structure a tuned circuit having a certain bandwidth which includes the frequencies at which the acoustic energy is generated. This liquid filled element presents an acoustic inertance in series with the source. The element may be a bore which is filled with liquid and is terminated at its output end by the drive cavity of the load coupling structure. The input end of the bore can be terminated by an acoustic transformer which reduces the dynamic pressure generated at the source as it is applied to the bore. The reduced input pressure accommodates for increases in acoustic pressure across the liquid filled elements of the apparatus, particularly across the series inertance element and in the drive cavity. The hydroacoustic amplifier can then operate at maximum pressure for generation of high energy levels while the elements which couple the acoustic energy to the load operate at different acoustic pressures, but not so high, relative to the average pressure, as to cause cavitation. The transformer also provides for impedance matching between the acoustic energy source and the load structure to optimize power transfer from the energy source to the load.

The foregoing and other objects, features and advantages of the invention as well as presently preferred embodiments thereof, will become more apparent from a reading of the following description in connection with the accompanying drawings in which:

FIG. 1 is a block diagram of hydroacoustic apparatus embodying the invention;

FIG. 2 is an electronic schematic diagram of the equivalent circuit of the apparatus shown in FIG. 1;

FIG. 3 is a block diagram of hydroacoustic apparatus in accordance with another embodiment of the invention;

FIG. 4 is a schematic diagram of the electrical eqivalent circuit of the apparatus shown in FIG. 3;

FIG. 5 is a block diagram of hydroacoustic apparatus in accordance with still another embodiment of the invention;

FIG. 6 is an electrical schematic diagram of the apparatus illustrated in FIG. 5;

FIG. 7 is a cross-sectional view, diagramatically illustrating the mechanical structure of the apparatus shown in FIG. 5;

Figure 8:
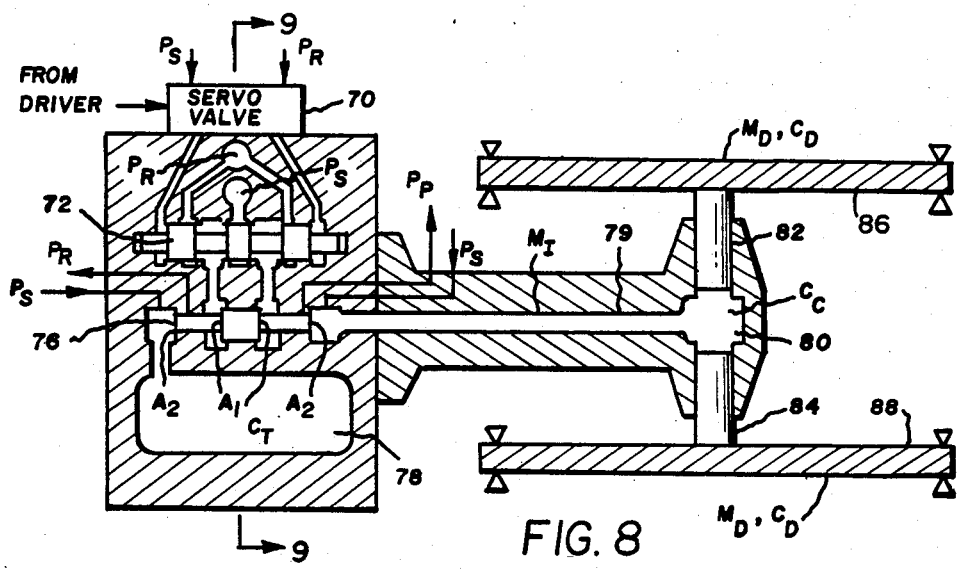
FIG. 8 is a cross-sectional view, diagramatically illustrating a hydroacoustic transducer embodying the invention.

Referring first to FIG. 1, an acoustic source 10 may be a two stage hydroacoustic source with a first stage electrohydraulic driver containing a servo valve and a power stage having a valve which is hydraulically driven by the servo valve driver first stage. A suitable hydroacoustic source with a servo valve driver and a four way valve power stage will be described hereinafter in connection with FIGS. 8 and 9. The present invention makes it possible to operate the acoustic source as a pressure source rather than a flow source so as to provide for the higher conversion efficiency from hydraulic power to acoustic power. Preferably, the hydroacoustic amplifier is operated as a switching amplifier with the valve switching the flow control orifices from fully open to fully closed.

The amplifier is connected to a step down pressure transformer 12. This transformer is a hydraulic transformer presenting a smaller area drive surface at its input side to the source 10 than at its output side. The output side of the transformer 12 is connected to a series inertance element 14. This element is provided by a liquid filled conduit, suitably a bore in a housing. The length of the bore and its cross-sectional area determine, along with the fluid density, the value of the inertance presented by the element 14. The inertance is indicated as $M_I$. The length of the bore may be much greater than its largest cross-sectional dimension (the diameter of the bore, if the bore is circular). The dimensions are selected so that the inertance of the element will be in proper relationship to the circuit elements presented by the load coupling structure provided by the drive cavity 18 and a radiator 16. The series element 14 may also act as a distributed transmission element for matching the source to the load.

Figure 9:
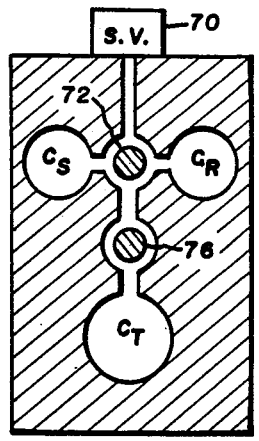
FIG. 9 is a cross-sectional view taken along the line 9—9 in FIG. 8.
Figure 10:
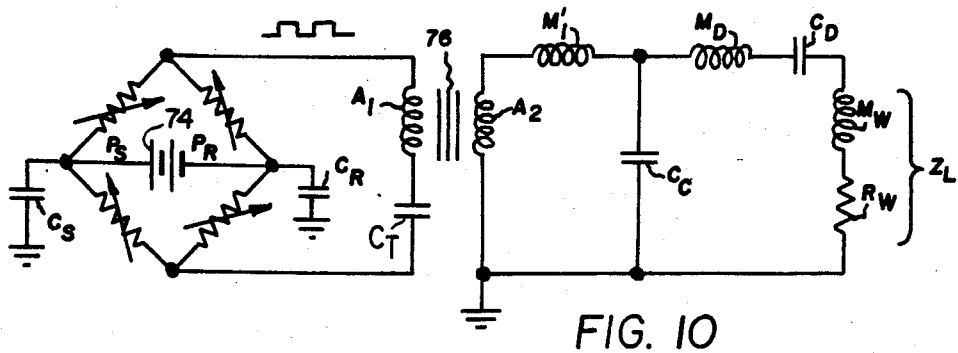
FIG. 10 is a electrical schematic diagram of the hydroacoustic transducer illustrated in FIGS. 8 and 9.

A typical electrical analog circuit of the apparatus shown in FIG. 1 is illustrated in FIG. 2. Reference may also be made to FIGS. 8, 9 and 10 which show another embodiment of the invention and its equivalent circuit in greater detail. The source 10 of FIGS. 1 and 2 is shown as a generator having a source strength $P_{AC}$. The transformer 12 is connected across the source and exhibits a self impedance characterized by the inertance $M_{DP}$, series connected by means of an appropriate transformer ratio to the load coupling structure. The load may, for example, include a flexural plate which is driven reciprocally by the fluid pressure variations in the drive cavity. The compliance and inertance of the flexural plate are indicated as $C_D$ and $M_D$. The radiation impedance of the water, as presented by the plate, is indicated as $Z_L$. This load representation has an inertance component $M_W$ and a resistance component $R_W$. The drive cavity is effectively in parallel with the representation of the loaded plate and presents a compliance $C_C$. The plate and drive cavity constitute the load coupling structure. All circuit elements are assumed to represent acoustic impedance elements properly referred to the driven side of the load coupling structure.

It will be seen that the driven elements define a double-mesh tuned circuit. The response of such a double-mesh tuned circuit is illustrated by curve (a) of FIG. 11, which shows two humps on either side of the center frequency, $f_0$. The double-tuned circuit is also an effective filter, so that primarily only the fundamental component of the square wave acoustic energy, which is generated by a switching hydroacoustic amplifier, such as the source 10, gets to the load. The series tuned apparatus enables simultaneously the achievement of high power conversion efficiency and double-tuned bandwidth broadening, and effective filtering of source-generated harmonics.

The series tuned configuration utilizes the transformer 12 to provide for impedance matching and to set acoustic pressure levels to avoid cavitation in the liquid filled elements of the apparatus. It will be appreciated that, in a series tuned circuit, the pressure across the individual reactive elements may be greater than the input drive pressure. The transformer decouples the source 10 from the elements of the load coupling structure so that they can operate at different acoustic pressures. The average pressure in the load circuit should be relatively high to prevent cavitation. For example, the average pressure could be 3,000 pounds per square inch (psi) on the load side and 1500 psi on the source side.

The apparatus may also be operated as a low frequency transducer as, for example, at great depths underwater without the need for pressure compensation. At low frequencies, well below the resonant frequency of the radiating plate, the shunting effect of the parallel compliances, $C_C$ may be negligible, and the governing impedance elements may be the compliance of the radiating plate, $C_D$, and the inertances $M_{DP}$ and $M_I$ of the series elements. The series inertance element 14 and the self inertance of the transformer, $M_{DP}$, may then be dimensioned so as to resonate with the compliance $C_D$ of the radiating element at a design center frequency, $f_0$. The response is then that of a simple series resonant circuit as shown in curve (b) of FIG. 11.

A stiff radiator plate may be used to act as one wall of a pressure vessel to withstand operations at great depths, yet it may be made to resonate at an arbitrary (low) frequency with the series inertance to achieve efficient transfer of energy of the radiation load. It will be appreciated that the use of the series inertance $M_I$ of FIGS. 1 and 2, which may be realized in the form of a long tube (79-FIG. 8), increases the flexibility for the design of the apparatus, since the source need not be mechanially positioned directly at the radiator 16 and its drive cavity 18, but may be located at a remote position with the aforementioned tube providing the interconnection. For example, a large heavy housing to accommodate the radiator, its drive cavity and the source may be replaced with a lighter housing for the radiator only, and the source may be located some distance away from the radiating structure, such as within the hull of a vessel, with the radiating structure placed external to the hull.

It will be seen, therefore, that the use of a series inertance element provides many advantages and new results over and above those obtained by direct coupling to the drive cavity of the load coupling structure; namely, flexibility in locating the source in desired space relationship with the load, reducing the weight of the apparatus, and retaining broad bandwidth and frequency response characteristics while providing for the use of high conversion efficiency acoustic sources.

Referring to FIG. 3, there is shown another embodiment of the hydroacoustic apparatus which enables the apparatus to operate over a wide frequency range with maximum power transfer efficiency. In this embodiment, like parts to those illustrated in FIGS. 1 and 2 are shown by like reference numerals. The same is true in other embodiments described hereinafter.

A plurality of series inertance elements 20, 22 and 24 are used each of which has a different inertance, $M_{I1}$, $M_{I2}$ and $M_{I3}$, for the three elements illustrated. These elements are switched into the coupling circuit by switching devices 26 and 28 which may be operated simultaneously by a controller 30. The switching devices may be rotary valves; for example, discs which are rotatable to connect an aperture therethrough to selected ones of three different bores which provide the series inertance elements 20, 22 and 24.

The equivalent electrical circuit is schematically shown in FIG. 4. For the purpose of this illustration, it is assumed in FIG. 4 that the system operates well below the resonant frequency of the radiator, that is the frequency at which the reactances of $C_D$ and $M_D$ are equal. The different inertance elements 20, 22 and 24 may be switched to provide different resonant frequencies with $C_D$, thereby extending the usable bandwidth of the system, as, for example, with sources at low frequencies where source dimensions are small compared to the wavelengths and the natural bandwidth is limited.

It may be desirable to provide an acoustic signal which sweeps in frequency across a broad frequency range of interest. In order to provide a continuous broad sweep, a variable-tuned frequency acoustic source 32 may be provided, as shown in FIGS. 5 and 7. A control signal generator 34 generates a variable frequency electrical signal (frequency sweep) which drives the variable frequency acoustic source 32. The same control signal operates a controller 36, which translates the frequency sweep of the control signal ($V_C$) into a corresponding mechanical displacement. To this end the controller 36 may be a frequency discriminator which produces an analog voltage for driving a motor 38 (See FIG. 7). The controller 36 changes the series inertance which couples the step down transformer 12 to the drive cavity 18 of the load coupling structure. The series inertance has a variable section 40 which provides the variable part of this series inertance $M_{IV}$ and a fixed section 42 which provides a fixed part of this series inertance $M_{IF}$.

FIG. 6 shows the equivalent circuit for the case where the radiating disc is operating below its natural resonant frequency. The inertance $M_{IV}$ changes so that the drive system remains at resonance over the entire frequency range of the sweep.

FIG. 7 shows an implementation of the apparatus illustrated in FIGS. 5 and 6. The acoustic source 32 has an electrohydraulic servo valve driver 44 to which the control signal $V_C$ is applied. This driver operates a power stage 46 of the source 32 to which pressurized hydraulic fluid is connected at a supply inlet $P_S$, returning at an outlet $P_R$ to the pumping system. The pressurized hydraulic fluid is switched from high pressure to low pressure in cavities 50 and 52. Because the valve 46 is a four-way valve, the pressure in the cavity 52 is 180° out of phase with the pressure in the cavity 50. The cavities 50 and 52 are in a housing 54 having a bore 56 which provides the series inertance. The bore 56 is separated into two sections by the hydraulic transformer 12. This transformer is a piston which is reciprocally mounted in the bore and which has opposite ends of equal area $A_2$. One end terminates the fixed length or fixed series inertance section $M_{IF}$ of the bore 56 and the other end terminates the variable length or variable inertance section $M_{IV}$ of the bore 56. The piston of the transformer has steps of smaller area $A_1$ which are exposed to the pressure variations in the cavities 50 and 52. The transformer 12 therefore tends to reduce the pressure in the bore, as well as in the elements of the apparatus which are hydraulically coupled to the bore, by the ratio which $A_1$ bears to $A_2$. The radiator 16 is indicated as a radiating disc 58 which is flexurally mounted at its periphery and which radiates signals, for example, into a body of water in which it is disposed. The disc may also be a coupling element to a piece of industrial apparatus, which is vibrated by the generated acoustic energy. A piston 60 is connected to the discs and is reciprocally mounted so that it presents a drive area 62 to the drive cavity 18.

In order to vary the inertance $M_{IV}$, a plunger 64 is reciprocally mounted into the section of the bore 56 which provides $M_{IV}$. This plunger is movable in response to $V_C$ by the controller 36. The plunger is connected to the motor 38 of the controller; for example, a rotary to linear motion translation mechanism such as a worm gear drive. It will be appreciated, therefore, that the inertance presented to the source 32 is variable depending upon the position of the plunger 64, which position is determined by the frequency of the generated acoustic signals. Therefore, the radiator 16 and its drive elements will be series tuned so that the power transfer efficiency of the system will be maximum over the entire sweep.

Referring to FIGS. 8, 9 and 10 there is shown a electrohydraulic driver first stage 70, as may contain a servo valve connected to a source of pressurized hydraulic fluid, the high and low pressure sides of which are indicated at $P_S$ and $P_R$, respectively. This servo valve is driven by an electrically controlled signal from a drive amplifier which may provide a square wave driving signal in order to operate the power stage as a switching amplifier. The power stage is provided by a four-way valve 72. Control pressures from the servo valve actuate the spool of the four-way valve to left and right positions. The spool ports flow from the high pressure supply port $P_S$ to a low pressure return port $P_R$. These inlet and outlet ports are shown as the terminals of a battery 74 in the equivalent circuit of FIG. 10. The valve ports of the four-way valve define a bridge circuit configuration as shown in FIG. 10. The outlet pressure appears across opposite sides of the bridge. The output pressure is a square wave switching from $P_S$ to $P_R$, when the four-way valve amplifier is operated as a switching amplifier.

The output pressure is supplied to an acoustic transformer piston provided by a spool on a shaft. This piston has its large area ends $A_2$ terminated at one end by a liquid-filled cavity 78 of compliance $C_T$, and at the other end by a bore 79 providing a portion of the series inertance element $M'_I$. The element $M'_I$ represents the effective series combination of the transformer self-inertance $M_{DP}$ and the inertance element $M_I$ in FIG. 2 $M_I$. The inertance $M'_I$ couples to a cavity 80 of compliance $C_C$ to which a pair of drive pistons 82 and 84 are exposed. The other ends of the pistons 82 and 84 are coupled to the center of a pair of flexural radiator discs 86 and 88. The radiators are suitably discs but may be flexural beams or other structures capable of coupling acoustic energy to an external medium. Both of the cavities 78 and 80 may be biased to equal pressures, well above ambient, by the hydraulic system to provide an average position for the acoustic transformer 76 balanced between end stops, and to avoid cavitation in the series inertance bore 79. Centering of the transformer be provided by a centering circuit, schematically illustrated in FIG. 8 by lines which are connected to the inlets and outlets $P_S$ and $P_R$. These lines may be restricted to have high resistance so that they do not affect or load down the AC pressure variations generated by the transformer piston motion. The ends of the lines which enter the bore in which the acoustic transformer piston reciprocates provide porting orifices which control the position of the acoustic transformer piston to center and provide a balanced average position for the transformer between its end stops. Such centering circuits are known in the art and are therefore not described in detail herein.

When the power stage is operated as a switching amplifier, the four-way valve 72 is driven between its end stops to expose the inner, driven surfaces (the steps of area $A_1$) of the transformer piston, alternatively, to supply and return pressures. The inlet and outlet ports, designated $P_S$ and $P_R$, respectively, in FIG. 8, are connected to liquid filled cavities of compliance $C_S$ and $C_R$ (shown in FIG. 9), which are used as acoustic filters at these inlets and outlets to maintain relatively fixed inlet and outlet pressures.

In operation in the switching mode, when the four-way valve is displaced to its left position in FIG. 8, the right step of the transformer piston, of areas $A_1$, is exposed to supply pressure and the left step is exposed to return pressure. When the four-way valve moves to its right position, the right step of the transformer piston is then exposed to return pressure and the left step is exposed to supply pressure. Thus, as the electrohydraulic driver 70 drives the four-way valve between its end stops, in response to the control signal input, the driven surfaces of the acoustic transformer 76 are exposed to a push/pull square wave pressure signal, the amplitude of which is the difference between supply and return pressures. This square wave forcing function, as modified by the transformer ratio $A_1/A_2$, is applied to the acoustic circuit elements which include and the series inertance $M_I$ presented by the bore 79, all together represented by $M'_I$. The forcing function, as modified by these inertance elements, is then applied to the shunt compliance of the drive cavity $C_C$, and through the drive pistons 82, 84 to the radiating elements provided by the radiator disks 86 and 88 and the radiation load thereon. These acoustic circuit elements define acoustic energy transmission means for the acoustic energy developed by the four way valve switching amplifier, which is transformed by the transformer. These elements are indicated in the electrical circuit $C_T$, $M'_I$, $C_C$, $M_D$, $C_D$, $M_W$, and $R_W$.

Figure 11:
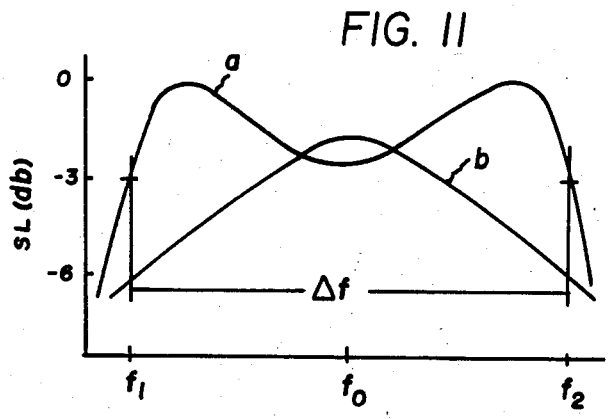
FIG. 11 are curves illustrating the frequency response, in terms of sound level over normalized frequency, of hydroacoustic apparatus embodying the invention.

The electrical equivalent circuit in FIG. 10, like the equivalent circuit shown in FIG. 2, shows that these elements form a double mesh circuit having the characteristics of a half-section band pass filter which provides a double-humped response as shown in curve (a) of FIG. 11. The four-way valve amplifier stage provides high conversion efficiency, and the series connected, double-tuned drive system maximizes the frequency response over the frequency range of interest for the radiator structure used. The transformer 76 provides for impedance matching and sets a pressure level so as to avoid cavitation in the liquid filled elements of the system.

From the foregoing description, it will be apparent that there has been provided improved hydroacoustic apparatus, useful for the efficient generation of broadband acoustic energy. While several embodiments of the invention have been described, further variations and modifications, within the scope of the invention, will undoubtedly suggest themselves to those skilled in the art. For example, the series inertance element maybe a quarter wavelength coupler. Accordingly, the foregoing description should be taken as illustrative and not in a limiting sense.

I claim:

1. Hydroacoustic apparatus for transferring acoustic energy efficiently and over a broad bandwidth to an acoustic load such as, but not limited to, either a radiating plate or disc, which apparatus comprises a source of acoustic energy in which liquid flow is modulated, a load coupling structure including a liquid filled drive cavity, and a coupling element including a stepped piston transformer in series between said source and said liquid filled drive cavity, said load coupling structure and said coupling element defining a tuned filter having a center frequency $f_o$ and bandwidth $\Delta f$ over which said acoustic energy is transmitted to said load.

2. The apparatus according to claim 1 wherein said element presents an acoustic inertance in series with said source and said structure.

3. An apparatus according to claim 1 wherein said element presents a distributed transmission element for impedance matching said source to said load.

4. The apparatus according to claim 2 wherein said element comprises a liquid filled cavity much greater in length than in its largest cross-sectional dimension.

5. The apparatus according to claim 2 wherein said load coupling structure includes a pressure-actuated piston exposed on one end to fluid pressure in said liquid-filled drive cavity, said piston engaging an acoustic load on its other end, said element extending between said source and said liquid-filled drive cavity.

6. The apparatus according to claim 5 wherein said acoustic load comprises a moveable surface exposed on one side to a physical medium into which acoustic energy is to be generated and on the other side to said pressure-actuated piston.

7. The apparatus according to claim 1 wherein the liquid in said source is pressurized and has a first hydraulic pressure and the liquid in said liquid filled cavity has a second hydraulic pressure, said transformer being connected in such relationship between said source and said coupling structure to isolate the second hydraulic pressure at said drive cavity of said structure from the first pressure at said source, whereby said first and second hydraulic pressures can be selected independently to optimize power conversion performance and to avoid cavitation.

8. The apparatus according to claim 7 wherein said piston of said transformer has a first area presented to said source and a second area presented to a liquid-filled portion of said coupling element which portion connects with said liquid-filled drive cavity of said load structure.

9. The apparatus according to claim 2 wherein said acoustic source is an acoustic pressure source.

10. The apparatus according to claim 9 wherein said pressure source is a hydroacoustic amplifier including a driver stage and a power stage, said power stage having a valve.

11. The apparatus according to claim 10 wherein said amplifier includes means for operating said driver and said valve to switch flow through said valve on and off whereby to operate said amplifier as a switching amplifier.

12. The apparatus according to claim 11 wherein said coupling element includes a liquid-filled element having a length much longer than the largest distance across its cross section, a piston movable into and out of the said liquid-filled drive cavity, said drive cavity terminating the end of said liquid-filled coupling element opposite to the end thereof terminated by said transformer.

13. The apparatus according to claim 12 wherein said load further comprises an acoustic energy radiator coupled to said piston.

14. The apparatus according to claim 11 wherein said valve is a four-way valve, said power stage having a high pressure supply port inlet and a low pressure return port outlet, flow passages between said inlet and outlet in which said valve is disposed, said acoustic transformer piston having a pair of drive areas exposed to different ones of said flow paths, said transformer piston also having stops limiting its axial displacement, and means for centering said piston between said stops to provide a balanced average position thereof.

15. The apparatus according to claim 14 wherein said valve defines a bridge circuit for the flow of fluid between said inlet and outlet, the end of said transformer defined by said drive areas of said piston being connected across said bridge circuit.

16. The apparatus according to claim 2 wherein said load coupling structure presents a compliance to said source, and said coupling element presents an inertance to said source, said compliance and inertance defining a series resonant circuit which couples acoustic energy from said source to the load.

17. The apparatus according to claim 2 wherein said liquid filled drive cavity has a piston therein movable in response to said acoustic energy, said load and said piston in said drive cavity defining with said inertance of said coupling element said tuned filter with a band pass frequency response extending over said band width.

18. The apparatus according to claim 19 wherein said load comprises a radiation load presented to said piston in said drive cavity by the medium which said piston faces, said piston and load defining inertance and compliance elements in series with said coupling element inertance, and said drive cavity defining a compliance in shunt with said inertance and compliance elements.

19. The apparatus according to claim 18 further comprising means for varying the inertance of said element.

20. The apparatus according to claim 19 further comprising a plurality of elements which present acoustic inertances between said source and said drive cavity including said element, each having a different inertance from the others thereof, and means for selectively connecting different ones of said elements between said source and said load for providing said varying means.

21. The apparatus according to claim 19 wherein said inertance presenting element includes a liquid filled bore, and said varying means comprises means for varying the cross sectional area of said bore.

22. The apparatus according to claim 21 wherein said varying means comprises a plunger in said bore moveable in directions into and out of said bore.

23. The apparatus according to claim 21 wherein said source is a variable frequency source and further comprising means for varying the frequency of said energy from said source, and means for operating said bore area varying means in accordance with the variation in source frequency.

24. The apparatus according to claim 21 wherein said stepped piston transformer is a hydraulic transformer provided by a piston movable in said bore, said piston having opposite ends terminating a first section of said bore which is in hydraulic communication with said load and a second section of said bore, said piston having at least one step presenting a driven area in hydraulic communication with said source so that said piston reciprocates along said bore in response to the acoustic energy generated by said source, said varying means including a plunger reciprocably mounted in said second section of said bore.

25. The apparatus according to claim 24 wherein said source is a variable frequency source, and further comprising means for varying the frequency of said acoustic energy from said source and the position of said plunger simultaneously to tune said inertance presenting element to present an inertance corresponding to said frequency.

26. The apparatus according to claim 18 in which acoustic energy generated by said source is impedance transformed by said element and coupled to said liquid-filled drive cavity generating acoustic pressures therein, said acoustic pressures acting upon said pressure-actuated piston to transfer energy to said physical medium.

27. Hydroacoustic apparatus for delivering energy to an acoustic load such as, but not limited to, either a radiating plate or disc, comprising a housing means having a first cavity and a second cavity, a first spool reciprocally mounted in said first cavity, a second spool reciprocally mounted in said second cavity, means including said first spool and a plurality of conduits for pressurized hydraulic fluid defining a four-way valve, means including said second spool having first and second areas of different size reciprocally mounted in said second cavity and defining a hydraulic transformer, conduits coupling said first and second cavities to each other for the application of hydraulic pressure to said first area of said second spool, and hydraulic fluid-filled acoustic energy transmission means coupled to at least one of said second areas of said second spool for coupling said energy to said load, said transformer being in series connection between said load and said four-way valve.

28. The apparatus according to claim 19 wherein said inertance presenting element includes a liquid-filled bore, and said varying means comprises means for varying the length of said bore.

29. Hydroacoustic apparatus for transferring acoustic energy over a broad bandwidth to a load such as, but not limited to, either a radiating plate or disc, which apparatus comprises a source of acoustic energy in which liquid flow is modulated, a liquid filled drive cavity, a piston connected to said load extending into said drive cavity, and a stepped piston transformer in series connection between said source and said drive cavity, said piston transformer having at least one first area exposed to said liquid flow from said source and a second area exposed to said liquid filled drive cavity.

30. The apparatus as set forth in claim 29 wherein said load is a body defining an acoustic radiator and having a piston connected to and extending from one side thereof into said drive cavity.

31. The apparatus according to claim 29 wherein said load is provided by a pair of radiator bodies having opposite sides, pistons connected to one of the opposite sides of each of said bodies and extending into said drive cavity.

32. The apparatus according to claim 29 including means defining a body of liquid to which said second area is exposed and which is in communication with said drive cavity, said body of liquid also being connected in series with said source, said transformer and said drive cavity.

33. The apparatus according to claim 29 wherein said source has an output stage defining a four-way valve with a pair or cavities in which said modulated flow is provided, said stepped piston transformer having a spool defining said second area and a pair of said first areas connected to different ones of said pair of cavities.

* * * * *